US011409309B2

(12) United States Patent
Wittenberg et al.

(10) Patent No.: US 11,409,309 B2
(45) Date of Patent: Aug. 9, 2022

(54) AUTOMATIC AIRCRAFT POSITIONING SYSTEMS AND METHODS

(71) Applicant: THE BOEING COMPANY, Chicago, IL (US)

(72) Inventors: Peter S. Wittenberg, Creve Coeur, MO (US); Michael K. Martin, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 328 days.

(21) Appl. No.: 16/817,661

(22) Filed: Mar. 13, 2020

(65) Prior Publication Data

US 2021/0286379 A1 Sep. 16, 2021

(51) Int. Cl.
*G05D 1/10* (2006.01)
*G01S 13/933* (2020.01)
(Continued)

(52) U.S. Cl.
CPC ............. *G05D 1/106* (2019.05); *B64D 39/00* (2013.01); *G01S 13/75* (2013.01); *G01S 13/933* (2020.01)

(58) Field of Classification Search
CPC ........ G05D 1/106; G05D 1/104; G05D 1/101; G05D 1/00; G05D 3/00; B64D 39/00; B64D 41/00; B64D 37/00; B64D 43/00; B64D 45/00; G01S 13/75; G01S 13/933; G01S 13/06; G01S 7/36; G01S 7/41; G01S 13/58; G01S 13/93; G01S 13/00; G01S 7/481; G01S 1/24; G01S 13/42; G01S 13/46;
(Continued)

(56) References Cited

U.S. PATENT DOCUMENTS 4,170,773 A * 10/1979 Fitzsimmons .......... G01S 13/42
342/42
5,933,099 A * 8/1999 Mahon ................. G08G 5/0078
340/963
(Continued)

FOREIGN PATENT DOCUMENTS

EP 2338793 6/2011

OTHER PUBLICATIONS

Extended European Search Report for EP 21153124.9-1202, dated Jul. 23, 2021.

*Primary Examiner* — Bhavesh V Amin
(74) *Attorney, Agent, or Firm* — The Small Patent Law Group LLC; Joseph M. Butscher

(57) ABSTRACT

An automatic aircraft positioning system includes a first aircraft including one more fiducials, and a second aircraft including a positioning radar, control devices that are configured to control operation of the second aircraft, and a control unit in communication with the positioning radar and the control devices. The positioning radar is configured to transmit a radar transmit signal. The one or more fiducials are configured to receive the radar transmit signal and output one or more return signals in response to the radar transmit signal. The positioning radar is configured to receive the one or more return signals and determine a position and orientation of the second aircraft relative to the first aircraft, or vice versa, from the one or more return signals. The control unit is configured to automatically control the second aircraft in relation to the first aircraft during an automatic positioning mode.

20 Claims, 3 Drawing Sheets

(51) Int. Cl.
*B64D 39/00* (2006.01)
*G01S 13/75* (2006.01)

(58) Field of Classification Search
CPC .......... G01S 13/48; G01S 13/76; G01S 13/78;
G01S 13/79; G01S 13/87; G01S 17/93;
G01S 17/931; G01S 7/48; G01S 7/484;
G01S 1/00; G01S 3/00; G01S 5/00; G01S
7/00; G01S 11/00; G01S 17/00; G01S
15/00; G01S 19/00; G01S 1/70; G01S
1/72; G01S 1/02; G01S 1/04; G01S 1/08;
G01S 1/68; G01S 1/76; G01S 1/74; G01S
1/78; G01S 1/80; G01S 1/82; G01S 1/06;
G01S 1/10; G01S 1/14; G01S 1/20; G01S
1/38; G01S 1/42; G01S 1/44; G01S 1/46;
G01S 1/54; G01S 1/12; G01S 1/22; G01S
1/30; G01S 1/26; G01S 1/32; G01S 1/34;
G01S 1/36; G01S 1/48; G01S 1/50; G01S
1/52; G01S 1/56; G01S 1/58; G01S 3/02;
G01S 3/78; G01S 3/80; G01S 13/02;
G01S 13/66; G01S 13/74; G01S 13/86;
G01S 13/88; G01S 13/82; G01S 13/84;
G01S 13/89; G01S 13/91; G01S 13/95;
G01S 17/02; G01S 17/66; G01S 17/74;
G01S 17/86; G01S 17/87; G01S 17/88;
G08G 5/00; G08G 5/04; C40B 60/12;
G01M 17/00; G06F 17/11; G06F 17/00;
G06F 7/00; G09B 9/00; H04B 10/25;
H04B 10/50; H04B 10/516
See application file for complete search history.

(56) References Cited

U.S. PATENT DOCUMENTS

| | | | | |
|---|---|---|---|---|
| 6,669,145 B1 * | 12/2003 | Green | ................... | B64D 39/00 244/135 A |
| 6,889,941 B1 * | 5/2005 | McElreath | ............. | B64D 39/00 244/175 |
| 7,917,254 B2 * | 3/2011 | Krogh | ................. | G05D 1/0676 701/16 |
| 8,567,723 B2 * | 10/2013 | Etzkorn | ................. | B64D 39/00 244/135 A |
| 8,712,608 B2 * | 4/2014 | Pepicelli | ............... | B64C 39/024 701/4 |
| 9,488,979 B1 * | 11/2016 | Chambers | ............ | G05D 1/0022 |
| 9,489,852 B1 * | 11/2016 | Chambers | ............ | G08G 5/0069 |
| 9,933,521 B2 * | 4/2018 | Riley | ..................... | G05D 1/104 |
| 10,474,148 B2 * | 11/2019 | Clynne | ................ | H04N 7/181 |
| 10,654,584 B2 * | 5/2020 | Bosma | .................. | B64D 39/06 |
| 10,732,648 B2 * | 8/2020 | Crockett | ............... | G05D 1/104 |
| 10,971,023 B2 * | 4/2021 | Hegranes | ............. | G08G 5/0026 |
| 2004/0102876 A1 * | 5/2004 | Doane | ................... | B64D 39/00 701/9 |
| 2005/0055143 A1 * | 3/2005 | Doane | ................... | G05D 1/104 342/357.32 |
| 2005/0116109 A1 * | 6/2005 | Berard | .................. | B64D 39/00 244/135 A |
| 2006/0041345 A1 * | 2/2006 | Metcalf | .............. | B64D 45/0031 340/5.2 |
| 2006/0216674 A1 * | 9/2006 | Baranov | .................. | G09B 9/08 434/29 |
| 2008/0099628 A1 * | 5/2008 | Greene | ................. | B64D 39/00 244/191 |
| 2008/0114544 A1 * | 5/2008 | Liu | ........................ | G05D 1/104 342/357.56 |
| 2008/0265097 A1 * | 10/2008 | Stecko | .................... | G01S 19/49 701/472 |
| 2008/0270027 A1 * | 10/2008 | Stecko | ................... | G01S 19/14 701/476 |
| 2008/0294307 A1 * | 11/2008 | Krogh | ................... | G08G 5/025 701/8 |
| 2009/0015436 A1 * | 1/2009 | Lundberg | ............... | B64D 39/00 340/945 |
| 2009/0045290 A1 * | 2/2009 | Small | .................... | B64C 39/024 244/135 A |
| 2011/0169684 A1 * | 7/2011 | Margolin | ............... | G01S 13/003 342/30 |
| 2012/0059536 A1 * | 3/2012 | Pepicelli | ............... | B64C 39/024 701/11 |
| 2012/0162014 A1 * | 6/2012 | Wu | ........................ | G01S 13/765 342/387 |
| 2015/0331099 A1 * | 11/2015 | Wu | ......................... | H04K 3/82 342/32 |
| 2019/0372669 A1 * | 12/2019 | Ziegler | ................ | H04B 10/502 |
| 2020/0312165 A1 * | 10/2020 | Hegranes | ............. | G08G 5/0026 |
| 2021/0096209 A1 * | 4/2021 | Daigle | ................... | G01S 7/003 |
| 2021/0286379 A1 * | 9/2021 | Wittenberg | ............ | G05D 1/106 |

* cited by examiner

AUTOMATIC AIRCRAFT POSITIONING SYSTEMS AND METHODS

FIELD OF THE DISCLOSURE

Embodiments of the present disclosure generally relate to automatic aircraft positioning systems and methods, such as may be used during an in-flight refueling process.

BACKGROUND OF THE DISCLOSURE

During a flight, an aircraft may need to be refueled. Certain aircraft are configured as fuel tankers that are configured to refuel another aircraft during a flight. For example, a fuel tanker may include a boom or drogue that is extended behind the fuel tanker during a flight. The boom is coupled to a fuel line. A trailing aircraft is maneuvered to the end of the boom, which is then attached to a fuel inlet of a probe of the trailing aircraft. After the boom of the fuel tanker is connected to the fuel inlet of the trailing aircraft, an in-flight refueling of the trailing aircraft occurs.

Typically, a pilot of the trailing aircraft maneuvers the trailing aircraft in relation to the fuel tanker. The pilot manually operates the control devices of the trailing aircraft to guide the probe to the boom (engagement), and ensure a connection therebetween. Once the fuel inlet is connected to the boom, the pilot continues to manually operate the control devices of the trailing aircraft to ensure that the fuel inlet remains coupled to the boom as the trailing aircraft is refueled. Typically, as the trailing aircraft is being refueled, the pilot ensures that the trailing aircraft maintains position in relation to the fuel tanker, which is known as station-keeping. After the refueling process, the connection between the probe of the trailing aircraft is disconnected from the boom of the fuel tanker (disengagement), and the refueled aircraft continues flight, such as according to a particular mission.

As can be appreciated, the process of maneuvering a trailing aircraft in relation to the fuel tanker, and manually controlling the trailing aircraft (as well as the boom of the fuel tanker) during the refueling process requires a high level of skill and experience. In certain situations, such as during periods of turbulence, a pilot may have difficulty maneuvering the trailing aircraft in relation to the fuel tanker before and after the connection between the boom and the fuel inlet is attained (engagement and disengagement).

SUMMARY OF THE DISCLOSURE

A need exists for a system and a method for automatically controlling positioning (including position/location and/or orientation) of an aircraft during an in-flight refueling process. Further, a need exists for a system and a method for automatically maintaining a relative position between two different aircraft. Moreover, a need exists for a low cost, effective, and efficient automatic aircraft positioning system and method.

With those needs in mind, certain embodiments of the present disclosure provide an automatic aircraft positioning system that includes one or more fiducials coupled to a first aircraft. A positioning radar, control devices, and a control unit are coupled to a second aircraft. The control devices are configured to control operation of the second aircraft. The control unit is in communication with the positioning radar and the control devices. The positioning radar is configured to transmit a radar transmit signal. The one or more fiducials are configured to receive the radar transmit signal and output one or more return signals in response to the radar transmit signal. The positioning radar is configured to receive the one or more return signals and determine a position of the second aircraft relative to the first aircraft from the one or more return signals. The control unit is configured to automatically control the second aircraft in relation to the first aircraft during an automatic positioning mode based, at least in part, on the position of the second aircraft relative to the first aircraft.

Certain embodiments of the present disclosure provide an automatic aircraft positioning system including a first aircraft comprising one more fiducials, and a second aircraft including a positioning radar, control devices that are configured to control operation of the second aircraft, and a control unit in communication with the positioning radar and the control devices. The positioning radar is configured to transmit a radar transmit signal. The fiducial(s) are configured to receive the radar transmit signal and output one or more return signals in response to the radar transmit signal. The positioning radar is configured to receive the return signal(s) and determine a position of the second aircraft relative to the first aircraft from the return signal(s). The control unit is configured to automatically control the second aircraft in relation to the first aircraft during an automatic positioning mode.

In at least one embodiment, the positioning radar is further configured to output a position signal (which may include navigation information) indicative of the position and velocity (for example, the relative position) of the second aircraft relative to the first aircraft. The control unit is configured to receive the position signal and automatically control at least one of the control devices of the second aircraft based on the position signal.

In at least one embodiment, the control unit is configured to automatically control the second aircraft during an in-flight refueling process. For example, the first aircraft is a fuel tanker, and the second aircraft is configured to be refueled by the fuel tanker during flight.

In at least one embodiment, the fiducial(s) are secured to an outer portion of the first aircraft. As an example, the fiducial(s) are radio frequency identification (RFID) chips.

In at least one embodiment, the positioning radar is separate and distinct from a main radar of the second aircraft. The positioning radar is configured to operate at a first frequency, and the main radar is configured to operate at a second frequency that differs from the first frequency.

In at least one example, the second aircraft further includes an automatic positioning activator. The automatic positioning activator is configured to be engaged to transition the second aircraft from a manual control mode to the automatic positioning mode.

In at least one other example, the control unit automatically switches the second aircraft to the automatic positioning mode in response to the fiducial(s) being within range of the positioning radar.

In at least one embodiment, the one or more fiducials include at least three fiducials.

Certain embodiments of the present disclosure provide an automatic aircraft positioning method, including transmitting, from a positioning radar of a second aircraft, a radar transmit signal; receiving, by one or more fiducials installed on a first aircraft, the radar transmit signal; outputting, by the one or more fiducials, one or more return signals in response to the radar transmit signal; receiving, by the positioning radar, the one or more return signals; determining, by the positioning radar, a position of the second aircraft relative to the first aircraft from the one or more return signals; and automatically controlling, by a control unit of the second aircraft, the second aircraft in relation to the first aircraft based on said determining during an automatic positioning mode.

In at least one embodiment, the automatic aircraft positioning method also includes outputting, by the positioning radar, a position signal indicative of the position of the second aircraft relative to the first aircraft. Said automatically controlling includes receiving the position signal and automatically controlling at least one control of the second aircraft based on the position signal.

In at least one example, the automatic aircraft positioning method also includes engaging an automatic positioning activator of the second aircraft; and transitioning the second aircraft from a manual control mode to the automatic positioning mode in response to said engaging.

In at least one other example, the automatic aircraft positioning method also includes automatically switching, by the control unit, the second aircraft to the automatic positioning mode in response to the one or more fiducials being within range of the positioning radar.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an automatic aircraft positioning system and method that includes a first aircraft having one or more fiducials, and a second aircraft having a positioning radar that determines a relative position between the first aircraft and the second aircraft based on radar signals transmitted by the positioning radar and received (for example, reflected) from the fiducial(s). In at least one embodiment, a control unit is in communication with the positioning radar and automatically controls the second aircraft, such as to automatically maintain a relative position between the first aircraft and the second aircraft based on the radar signals received from the fiducial(s). The control unit automatically identifies a range and orientation (for example, angular position in both angle coordinates, specifically azimuth and elevation) between the first aircraft and the second aircraft based on the radar signals, and is able to maintain the second aircraft in a station-keeping position (for example, distance and orientation) during a refueling process. As such, embodiments of the present disclosure allow for automatic and safe station-keeping during a refueling process, instead of relying on manual control.

Figure 1:
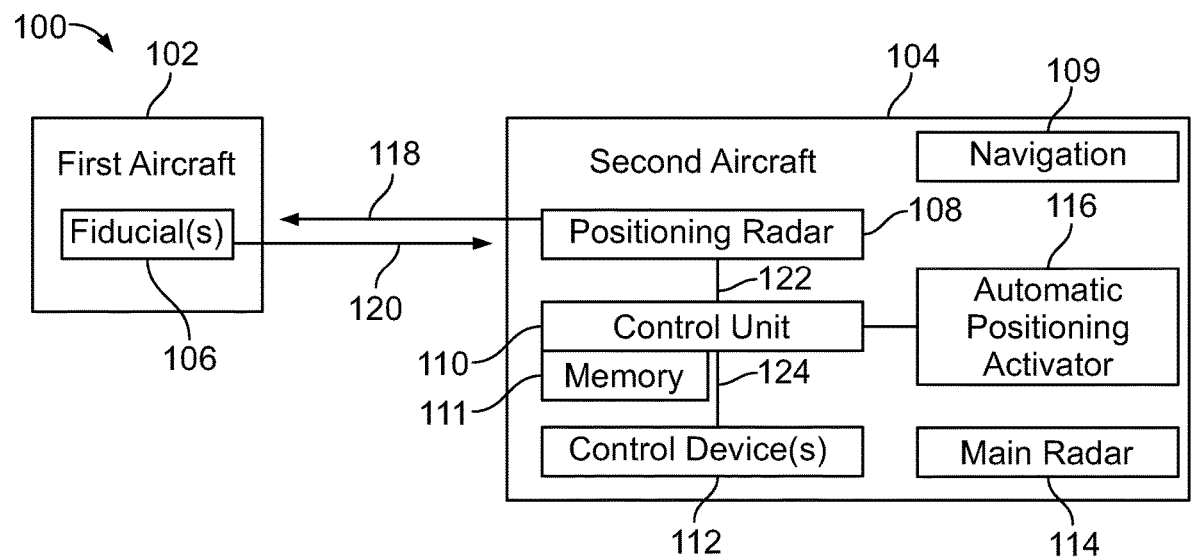
FIG. 1 illustrates a schematic block diagram of an aircraft positioning system in relation to a first aircraft and a second aircraft, according to an embodiment of the present disclosure.

FIG. 1 illustrates a schematic block diagram of an aircraft positioning system 100 in relation to a first aircraft 102 and a second aircraft 104, according to an embodiment of the present disclosure. In at least one embodiment, the first aircraft 102 is a fuel tanker, such as a KC-46, manufactured by The Boeing Company, and the second aircraft 104 is a military fighter jet, such as an F-15, manufactured by The Boeing Company. Optionally, as another example, the first aircraft 102 is a military fighter jet, and the second aircraft 104 is a fuel tanker. As another example, one or both of the first aircraft 102 or the second aircraft 104 is/are an unmanned aircraft, such as an unmanned aerial vehicle, drone, or the like.

The first aircraft 102 includes one or more fiducials 106. For example, the fiducial(s) 106 are secured to an outer portion of the first aircraft 102, such as a fuselage, wing, tail, or the like. The fiducials 106 are distinctive points, for example, that reflect or otherwise generate a radar signal in response to receipt of a transmitted radar signal, such as a transmitted radar beam or illumination. As one example, one or more of the fiducials 106 are passive or active radio frequency identification (RFID) chips. As another example, one or more of the fiducials 106 are retroreflectors with or without frequency selective surface coverings. For example, the fiducials 106 may be one or more retro-reflector arrays including frequency selective surfaces to minimize unwanted reflections. As another example, one or more of the fiducials 106 are antennas. As another example, one or more of the fiducials 106 are or otherwise include diodes. In general, the fiducials 106 are devices that are configured to output (such as reflect or otherwise generate) a unique identification signal in response to receipt of a radar transmit signal.

The fiducial(s) 106 may be relatively small. For example, the fiducial(s) 106 can be 10 centimeters or less in diameter or width. As another example, the fiducial(s) 106 can be 1 centimeter in diameter or width. As an example, the fiducial(s) can be 1 centimeter diameter button antennas. In at least one embodiment, the fiducials 106 are embodied as small-sized fiducial(s) 106 (such as those having diameters or width of 10 centimeters or less) to provide a smaller, point-like signature that are less prone to glint (a phenomenon in which signals are reflected from relatively larger surfaces such that a center of the surfaces may be difficult to discern).

The fiducial(s) 106 are located at predetermined and known locations on the first aircraft 102. Accordingly, a radar signal received from the fiducial(s) 106 by the positioning radar 108 allows the control unit 110 to determine a position (for example, distance and angular position), velocity, and attitude of the second aircraft 104 in relation to the first aircraft 102.

The second aircraft 104 includes the positioning radar 108 in communication with a control unit 110, such as through one or more wired or wireless connections. The control unit 110 is also in communication with one or more control devices 112 installed in the second aircraft 104, such as through one or more wired or wireless connections. The control devices 112 may be onboard the second aircraft 104 (such as within a cockpit), or remotely located from the second aircraft 104, such as if the second aircraft 104 is an unmanned aerial vehicle. In at least one embodiment, the second aircraft 104 also includes a main radar 114, which differs from the positioning radar 108. That is, in at least one embodiment, the positioning radar 108 is separate and distinct from the main radar 114. For example, in at least one embodiment, the main radar 114 is designed for long range targeting and fire control. In contrast, the positioning radar 108 is configured for shorter ranges, such as 500 feet or less. The second aircraft 104 can also include an automatic positioning activator 116 in communication with the control unit 110, such as through one or more wired or wireless connections.

The positioning radar 108 operates at a first frequency. The main radar 114 operates at a second frequency that differs from the first frequency. For example, the first frequency may be 50 GHz or greater, while the second frequency may be between 10 GHz-20 GHz. Operating the main radar 114 and the positioning radar 108 at different frequencies eliminates, minimizes, or reduces a potential of interference, cross-talk, hostile reception, and the like therebetween.

In at least one embodiment, the control unit 110 and/or the positioning radar 108 includes or is coupled to a memory 111 that stores fiducial data regarding the first aircraft 102. The fiducial data is indicative of the fiducial(s) 106 relative to one another and/or the first aircraft 102. As such, when return signals 120 are received from the fiducial(s) 106, the positioning radar 108 and/or the control unit 110 is able to determine the locations of the fiducial(s) 106, as detected, and in relation to the second aircraft 104. In at least one embodiment, the individual fiducial measurements are typically used to aid on onboard inertial navigation system, such as the navigation sub-system 109. The fiducial measurements (for example, range and angle) are in relation to the positioning radar 108 and the fiducials 106, whose positions on the first aircraft 102 are known a priori. The navigation sub-system 109 uses such information to determine relative position and velocity of the second aircraft 104 in relation to the first aircraft 102. The control unit 110, which may be part of a guidance and control sub-system, uses the navigation information to determine actions for the second aircraft 104 to take.

The control devices 112 are configured to allow for operation of the second aircraft 104. The control devices 112 are operatively coupled to various components of the second aircraft 104, such as engines, control surfaces on wings, stabilizers, etc., and the like. The control devices 112 may include one or more of a yoke, stick, joystick, pedals, buttons, switches, keyboards, touchscreens, and/or the like that are configured to control the various components of the second aircraft 104 during flight and on the ground (such as when taxiing on a runway). In at least one embodiment, the second aircraft 104 may not include onboard control devices, such as if the second aircraft is an unmanned aerial vehicle. In such an embodiment, the second aircraft 104 may be in communication with remote control devices.

In at least one embodiment, the automatic positioning activator 116 is configured to be engaged by an individual to initiate an automatic positioning process. In at least one embodiment, the automatic positioning activator is or includes a physical button, lever, switch, slide, key, or the like. Optionally, the automatic positioning activator 116 is or includes a virtual button, switch, slide, key, or the like, such as part of an electronic touchscreen interface.

In operation, the second aircraft 104 can be activated into an automatic positioning mode by the automatic positioning activator 116. For example, before and/or during a refueling process, a pilot may engage the automatic positioning activator 116 to allow the control unit 110 to automatically control and position the second aircraft 104 relative to the first aircraft 102. In general, the automatic positioning activator 116 is configured to be selectively engaged to selectively transition the second aircraft 104 between a manual control mode (in which a pilot controls operation of the second aircraft 104) to the automatic positioning mode (in which the control unit 110 automatically controls the second aircraft 104 based on a position signal 122 received from positioning radar 108, as described herein). As another example, the automatic positioning mode may occur when the first aircraft 102 and the second aircraft 104 are on the ground (or in the air) to ensure that the first aircraft 102 and the second aircraft 104 remain a predetermined distance from one another, such as to avoid collisions or other inadvertent encounters.

Optionally, the second aircraft 104 may not include the automatic positioning activator 116. Instead, the second aircraft 104 may automatically transition to the automatic positioning mode, such as when the fiducial(s) 106 are within a predetermined range of the positioning radar 108. In at least one embodiment, the control unit 110 automatically transitions the second aircraft 104 to the automatic positioning mode in response to the one or more fiducials 106 being within predetermined range of the positioning radar 108. In at least one embodiment, the second aircraft 104 includes a manual override mechanism (such as a physical or virtual button, lever, switch, key, slide, or the like) that allows a pilot to manually override the automatic positioning mode.

The predetermined range of the positioning radar 108 can be 500 meters, for example. Optionally, the predetermined range of the positioning radar 108 can be less than 500 meters, such as 200 meters. Thus, in operation, when the second aircraft 104 is within, for example, 500 meters of the first aircraft 102 as determined by the positioning radar 108, the control unit 122 may automatically transition the second aircraft 104 to the automatic positioning mode. If the pilot desires, the automatic transition mode may be deactivated by the pilot.

The positioning radar 108 transmits a radar transmit signal 118, such as a radar beam. When the fiducial(s) 106 are within the range of the positioning radar 108, the fiducial(s) 106 receive the radar transmit signal 118 and output one or more return signals 120. For example, the fiducial(s) 106 receive the radar transmit signal 118 and reflect associated signals back to the positioning radar 108 as the return signals 120. In at least one embodiment, the fiducial(s) 106 output identification information (such as stored identification codes or other such data) with the return signals 120, such as when the fiducial(s) 106 are RFID tags.

The positioning radar 108 receives the return signals 120 from the fiducial(s) 106 and determines the position of (including distance and angular distance between) the second aircraft 104 relative to the first aircraft 102. The control unit 110 analyzes a position signal 122 output by the positioning radar 108. The position signal 122 is indicative of the current position of the second aircraft 104 relative to the first aircraft 102.

In at least one embodiment, radar information (such as the position signal 122) is analyzed by the control unit 110 in conjunction with an on-board navigation sub-system 109. The navigation sub-system 109 generates a navigation output (for example, position, velocity, attitude, and the like), and an optional indication of the attitude of the first aircraft 102. The control unit 110 may operate the second aircraft 104 based on the radar information and the navigation output.

The control unit 110 then automatically operates the control devices 112 of the second aircraft 104 based on the position signal 122. For example, the control unit 110 outputs a positional control signal 124 to the control devices 112 to automatically operate the second aircraft 104 based on the position signal 122. In at least one embodiment, the control unit 110 automatically operates the second aircraft 104 to maintain a predetermined position (such as distance and angular position) between the second aircraft 104 and the first aircraft 102.

In at least one embodiment, the control unit 110 operates the control devices 112 based on the position signals 122 to automatically maneuver the second aircraft 104 in relation to the first aircraft 102 to connect a fuel inlet of a probe of the second aircraft 104 to a boom of the first aircraft 102, which may be a fuel tanker, for example. Further, the control unit 110 operates the control devices 112 to automatically maintain a predetermined position between the second aircraft 104 and the first aircraft 102 during the refueling process. As such, the control unit 110 operates the control devices 112 based on the position signal 122 for purposes of station-keeping. Optionally, the first aircraft 102 can be the aircraft that is being refueled, and the second aircraft 104 can be the aircraft that is used to refuel the first aircraft 102.

As another example, the control unit 110 operates the control devices 112 based on the position signals 122 to automatically position the second aircraft 104 relative to the first aircraft 102 in situations other than refueling operations. For example, the control unit 110 may automatically control the second aircraft 104 to maintain a predetermined separation distance between the first aircraft 102 and the second aircraft 104, whether the first aircraft 102 and the second aircraft 104 are in flight or on the ground. In general, the control unit 110 automatically operates the second aircraft 104 in relation to the first aircraft 102 based on the position signals 122 output by the positioning radar 108 that indicate the position of the first aircraft 102 relative to the second aircraft 104.

As described herein, the aircraft positioning system 100 includes the first aircraft including the one more fiducials 106. The second aircraft 104 includes the positioning radar 108. The positioning radar 108 is configured to transmit the radar transmit signal 118. The one or more fiducials 106 are configured to receive the radar transmit signal 118 and output the one or more return signals 120 in response to the radar transmit signal 118. The positioning radar 108 is further configured to receive the one or more return signals 120 and determine a position of the second aircraft 104 relative to the first aircraft 102 based on the one or more return signals 120. Further, the positioning radar 108 is configured to output the position signal 122 indicative of the position of the second aircraft 104 relative to the first aircraft 102. The control unit 110 is in communication with the positioning radar 108, and is configured to receive the position signal 122 and automatically control one or more control devices of the second aircraft 104 based on the position signal 122, such as to maintain the second aircraft 104 at a predetermined position in relation to the first aircraft 102.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 can be or include one or more processors that are configured to control operation thereof, as described herein.

The control unit 110 is configured to execute a set of instructions that are stored in one or more data storage units or elements (such as one or more memories), in order to process data. For example, the control unit 110 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit 110 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the control unit 110. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 110 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one embodiment, components of the aircraft positioning system 100, such as the control unit 110, provide and/or enable a computer system to operate as a special computer system for automatic aircraft positioning processes.

Figure 2:
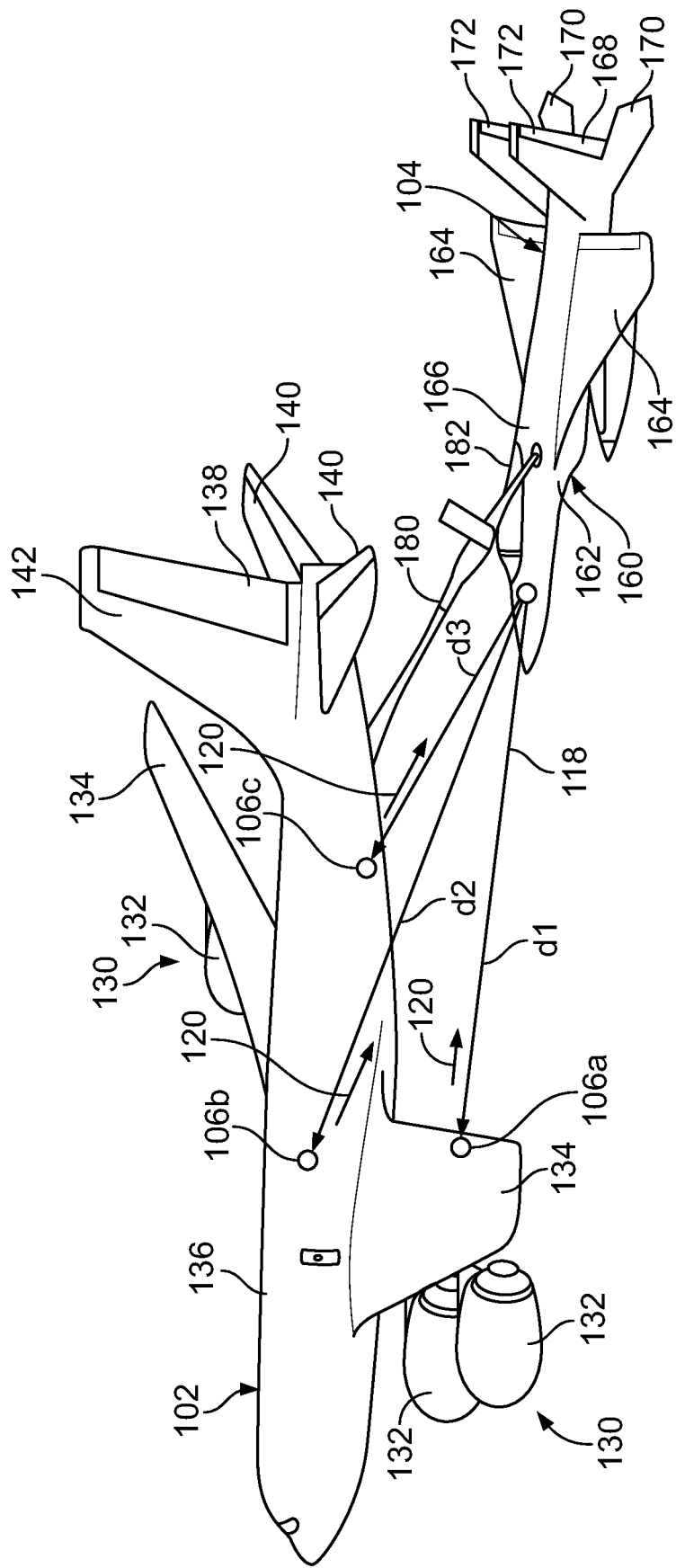
FIG. 2 illustrates a perspective view of a first aircraft refueling a second aircraft, according to an embodiment of the present disclosure.

FIG. 2 illustrates a perspective view of the first aircraft 102 refueling the second aircraft 104, according to an embodiment of the present disclosure. The first aircraft 102 includes a propulsion system 130 that may include one or more engines 132, for example. The engines 132 are carried by wings 134 of the first aircraft 102. In other embodiments, the engines 132 may be carried by a fuselage 136 and/or an empennage 138. The empennage 138 may also support horizontal stabilizers 140 and a vertical stabilizer 142. The second aircraft 104 includes a propulsion system 160 that may include one or more engines 162, for example. The engines 162 are carried by wings 164 and/or a fuselage 166 of the second aircraft 104. In other embodiments, the engines 162 may be carried by the fuselage 166 and/or an empennage 168, which may also support horizontal stabilizers 170 and vertical stabilizers 172.

As shown in FIG. 2, a first fiducial 106a is secured to the wing 134 of the first aircraft 102. A second fiducial 106b is secured to an upper and/or lateral surface of the fuselage 136 of the first aircraft 102. A third fiducial 106c is secured to a lower and/or lateral surface of the fuselage 136 of the first aircraft 102. Optionally, the first aircraft 102 may be include more (such as four or more) or less (such as one or two) fiducials 106. Further, the fiducials 106 may be located at different areas of the first aircraft 102. For example, the boom 180 may include one or more fiducials 106, such as proximate a distal end that mates with the probe 182.

In at least one embodiment, the first aircraft 102 is a fuel tanker that extends a boom 180 having a fuel line. The second aircraft 104 includes a probe 182 having a fuel inlet. Referring to FIGS. 1 and 2, the positioning radar 108 outputs the radar transmit signal 118 (such as a radar transmit beam). The fiducials 106a, 106b, and 106c receive the radar transmit signal 118 and, in response, output (such as reflect or otherwise generate) the return signals 120, which are received by the positioning radar 108 of the second aircraft 104. The positioning radar 108, in turn, outputs the position signal 122 to the control unit 110. In operation, the control unit 110 uses the position signal 122 and a priori information of the locations of the fiducials 106 installed on the first aircraft 102 to determine a relative position of the second aircraft 104 relative to the fiducials 106a, 106b, and 106c, and therefore the first aircraft 102. More specifically, the control unit 110 receives the position signal 122, and outputs the positional control signal 124 to the control devices 112, thereby automatically controlling the second aircraft 104 relative to the first aircraft 102. In this manner, the control unit 110 can automatically operate the second aircraft 104 relative to the first aircraft 102 to automatically maneuver the probe 182 to the boom 180, and/or station-keep the second aircraft 104 relative to the first aircraft 102 during a refueling process.

As such, embodiments of the present disclosure provide systems and methods for automatic station-keeping of the second aircraft 104 during in-flight refueling. Because the fiducials 106 are relatively small, the systems and methods are able to effectively operate even in bright sunlight, for example, as the fiducials 106 are not or at least less susceptible to inaccuracies caused by glint. Further, the positioning radar 108 provides a low-cost component that can be quickly and easily added to the second aircraft 104, in contrast to more expensive and complex light detection and ranging (LIDAR) systems, laser-based systems, other such optical systems, or the like. Further, modification to the first aircraft 102 is slight, as only the fiducials 106 are secured thereto. Accordingly, embodiments of the present disclosure provide low-cost and effective systems and methods for automatically controlling the second aircraft 104 relative to the first aircraft 102. The first aircraft 102 and the second aircraft 104 may be manufactured having the components described herein, or existing aircraft can be quickly and easily retrofit with the fiducials 106 and the positioning radar 108 at a relatively low cost.

The fiducials 106 provide unique return signals 120, that are separate and distinct from the other portions of the first aircraft 102. As such, the positioning radar 108 analyzes the return signals 120 from the fiducials 106, and can ignore other reflected signals. By analyzing the return signals 120 from the fiducials 106, the positioning radar 108 determines an accurate and definite position and orientation of the first aircraft 102 relative to the second aircraft 104 without other portions of the first aircraft 102 distorting a resulting radar image, such as included in the position signal 122.

As described, the fiducials 106 respond to radar illumination, such as the radar transmit signal 118. In at least one embodiment, the fiducials 106 respond with an encoded transmission so that the positioning radar 108 is able to uniquely identify each fiducial 106. As one example, fiducials 106 on a right side of the first aircraft 102 respond to radar illumination from the right side of the first aircraft 102, and fiducials 106 on the left side of the first aircraft 102 respond to radar illumination from the left side.

In at least one embodiment, using at least three fiducials 106, and determining (by the positioning radar 108) distance measurements for each of the three fiducials 106 at almost the same time allows for identification of the position and orientation of the positioning radar 108 and therefore the second aircraft 104 relative to the first aircraft 102. In at least one embodiment, additional fiducials 106 improve the accuracy of the measurements and provide operational redundancy.

As shown in FIG. 2, each of the distances d1, d2, and d3 between the fiducials 106, 106b, and 106c, respectively, and the positioning radar 108 can be mapped onto the location of the positioning radar 108 relative to the first aircraft 102. The control unit 110 of the second aircraft 104 also receives orientation information of the second aircraft 104 (such as from a flight computer, instruments, and/or the like).

As noted, the fiducials 106 can be or otherwise include RFID chips, whether passive or active. Active RFID chips (such as including batteries) can be used when increased power may be needed. Passive RFID chips can be used when the energy of the radar transmit signal 118 is sufficient to trigger the RFID chip.

In at least one embodiment, the radar transmit signal 118 is output at a broad angular swath to allow all of the fiducials 106 to be detected by the positioning radar 108 at the same (or substantially the same) time. In at least one embodiment, the positioning radar auto-correlates transmitted codes of the RFID chips to discern between the different RFID chips.

In at least one embodiment, in order to determine range, the positioning radar 108 outputs the radar transmit signal 118 as a frequency modulation continuous wave. If a knowledge of the relative distance to the fiducial 106 is desired to have 30 cm range bins, for example, then the positioning radar 108 may transmit a 500 MHz chirp to determine the range (Sweep bandwidth=c/2*Range bin width=$3.10^8$/(2*0.3)=500 MHz).

The processing on the return side may not require 500 MHz sampling as the nature of the frequency modulation continuous wave is such that only the bandwidth related to the distance may be needed, which may be on the order of 333 kHz for a 100 m, 1 ms sweep. The bandwidth after frequency modulation continuous wave mixing may be determined as follows:

Baseband width=(Swath width of interest/(150 km/ms*Sweep time))*Sweep bandwidth

=(100 m/(150 km/ms*1 ms))*500 MHz

=(100/150000)*500

=0.333 MHz

=333 kHz

In at least one embodiment, the fiducials 106a, 106b, and 106c are differentiated from each other and from the first aircraft 102 itself. In at least one example, there may be a deliberate frequency shift for each fiducial 106a, 106b, and 106c. For example, suppose that the fiducial 106a is set to repeat the transmitted waveform, but with a 500 kHz shift. On the return, the sampling rate for the positioning radar 108 is high enough to incorporate the 500 kHz added. The return that came back adds together the 0 to 333 kHz shift caused by the range d1 and the 500 kHz added fiducial frequency differential as well as the frequency from the relative doppler between the positioning radar 108 and the fiducial 106a. Any return signal between 500 kHz and about 833 kHz would then be from the fiducial 106a.

Next, the fiducial 106b may have a 1 MHz shift and the return from the fiducial 106b may be between 1,000 kHz and 1,333 kHz plus a small relative doppler. Adding each fiducial in turn with another 500 kHz shift (fiducial differential frequency for the nth fiducial=n*500 kHz) allows a unique section of spectrum for the returns from each fiducial 106a, 106b, and 106c. If, for example, there are ten fiducials 106 for the first aircraft 102, the maximum return frequency after frequency modulation continuous wave mixing is only 5,833 kHz. As such, the positioning radar 108 is able to provide high resolution and accurate range (to 30 cm range bins) measurements.

As one example of determining the position of the second aircraft 104 from observed ranges and reference ranges, the vector of ranges $\vec{d}_O$=(d1, d2, d3, . . . , dN) may be the measured distances from the positioning radar 108 to each of the n fiducials 106a, 106b, and 10c. Further, let $\vec{p}_m$=($i_m$, $j_m$, $k_m$) be a position vector first aircraft centric coordinate system (typically (i, j, k) where the vector $\vec{i}$ is along the fuselage reference line, the vector $\vec{j}$ is perpendicular to the vector $\vec{i}$ down the right wing, and the vector $\vec{k}$ is pointing down in the direction of $\vec{i} \times \vec{j}$. Next, create a reference vector $\vec{r}_m$=(r1, r2, r3, . . . , rN) of the distances from the first aircraft coordinate vector to each of the fiducials. The reference vectors are stored as a lookup table prior to flight. The reference vector $\vec{r}_m$ is closest to the measurement vector $\vec{d}_O$, and is determined by calculating a length of the reference vector as the norm $|\vec{r}_m|$, and the values of the reference vectors for each point $\vec{p}_m$ are stored, such as in a memory. To reduce comparison space, points whose length is similar to that of the measurement vector are considered. Thus, the only points m that are considered are those for which $|\vec{r}_m|-|\vec{d}_o|<\varepsilon$, where ε is chosen to be on the order of a few range bins. Among such set of points, the closest point $\vec{p}_m$ is the one with m such that $|\vec{r}_m-\vec{d}_o|$ is minimized. With the values of $\vec{p}_m$=($i_m$, $j_m$, $k_m$) available, such information can be input into a navigation filter that directs the second aircraft 104 to a specified location.

Figure 3:
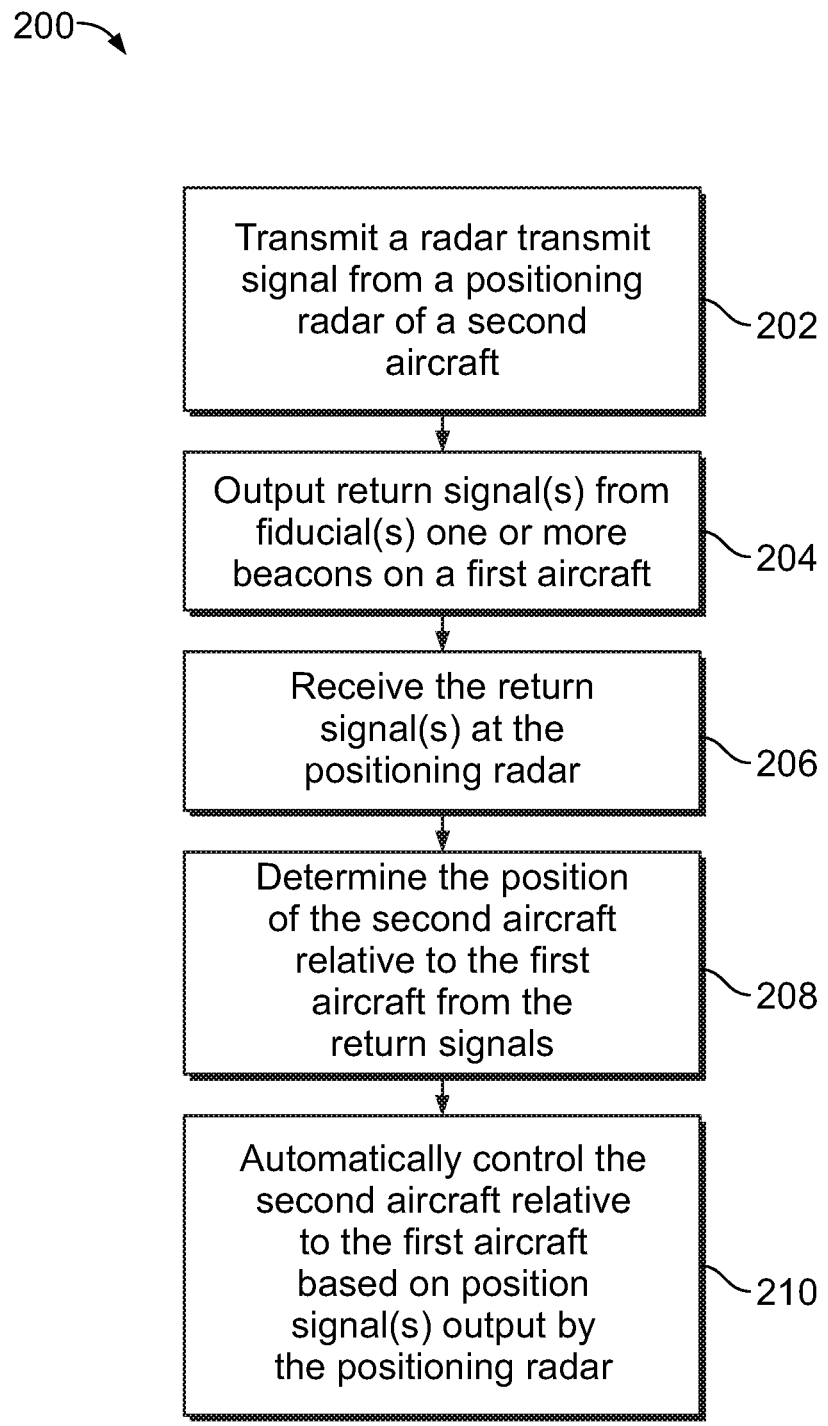
FIG. 3 illustrates a flow chart of an aircraft positioning method, according to an embodiment of the present disclosure.

FIG. 3 illustrates a flow chart of an aircraft positioning method 200, according to an embodiment of the present disclosure. Referring to FIGS. 1 and 3, the one or more fiducials 106 are on a first aircraft 102. At 202, the radar transmit signal 118 is transmitted from the positioning radar 108 of the second aircraft 202. At 204, the fiducial(s) 106 output one or more return signals 120 in response to receiving the radar transmit signal 118. At 206, the return signals 120 output by the fiducial(s) 106 are received at and by the positioning radar 108. At 208, the positioning radar 108 determines a position (such as may include distance and angular position between) of the second aircraft 104 relative to the first aircraft 102 from the return signals 120. At 210, the control unit 110 automatically controls the second aircraft 104 relative to the first aircraft 102 based on the position signals 122 output by the positioning radar 108.

In at least one embodiment, an automatic aircraft positioning method includes providing the one or more fiducials 106 on the first aircraft 102; transmitting, from the positioning radar 108 of the second aircraft 104, the radar transmit signal 118; receiving, by the one or more fiducials 106, the radar transmit signal 118; outputting, by the one or more fiducials 106, one or more return signals 120 in response to the radar transmit signal 118; receiving, by the positioning radar 108, the one or more return signals 120; determining, by the positioning radar 108, a position of the second aircraft 104 relative to the first aircraft 102 from the one or more return signals 120; and automatically controlling, by the control unit 110 of the second aircraft 104, the second aircraft 104 in relation to the first aircraft 102 based on said determining during an automatic positioning mode. In at least one embodiment, said automatically controlling occurs during an in-flight refueling process.

In at least one embodiment, the automatic aircraft positioning method also includes outputting, by the positioning radar 108, the position signal 122 indicative of the position of the second aircraft 104 relative to the first aircraft 102. Said automatically controlling includes receiving the position signal 122 and automatically controlling at least one of the control devices 112 of the second aircraft 104 based on the position signal 122.

In at least one embodiment, the automatic aircraft positioning method further includes engaging the automatic positioning activator of the second aircraft 104; and transitioning the second aircraft 104 from a manual control mode to the automatic positioning mode in response to said engaging. In at least one other embodiment, the automatic aircraft positioning method further includes automatically switching, by the control unit 110, the second aircraft 104 to the automatic positioning mode in response to the one or more fiducials 106 being within range of the positioning radar 108.

As described herein, embodiments of the present disclosure provide systems and methods for automatically controlling positioning of an aircraft during an in-flight refueling process. Further, embodiments of the present disclosure provide systems and methods for automatically maintaining a relative position between two different aircraft. Moreover, embodiments of the present disclosure provide low cost, effective, and efficient automatic aircraft positioning systems and methods.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An automatic aircraft positioning system, comprising:
one or more fiducials coupled to a first aircraft; and
a positioning radar, control devices, and a control unit coupled to a second aircraft, wherein the control devices are configured to control operation of the second aircraft, and wherein the control unit is in communication with the positioning radar and the control devices,
wherein the positioning radar is configured to transmit a radar transmit signal,
wherein the one or more fiducials are configured to receive the radar transmit signal and output one or more return signals in response to the radar transmit signal,
wherein the positioning radar is configured to receive the one or more return signals and determine a position of the second aircraft relative to the first aircraft from the one or more return signals, and
wherein the control unit is configured to automatically control the second aircraft in relation to the first aircraft during an automatic positioning mode based, at least in part, on the position of the second aircraft relative to the first aircraft.

2. The automatic aircraft positioning system of claim 1, wherein the positioning radar is further configured to output a position signal indicative of the position and orientation of the second aircraft relative to the first aircraft, and wherein the control unit is configured to receive the position signal and automatically control at least one of the control devices of the second aircraft based on the position signal.

3. The automatic aircraft positioning system of claim 1, wherein the control unit is configured to automatically control the second aircraft during an in-flight refueling process.

4. The automatic aircraft positioning system of claim 1, wherein the first aircraft is a fuel tanker, and wherein the second aircraft is configured to be refueled by the fuel tanker during flight.

5. The automatic aircraft positioning system of claim 1, wherein the one or more fiducials are secured to an outer portion of the first aircraft.

6. The automatic aircraft positioning system of claim 1, wherein the one or more fiducials are radio frequency identification (RFID) chips or one or more retro-reflector arrays including frequency selective surfaces to minimize unwanted reflections.

7. The automatic aircraft positioning system of claim 1, wherein the positioning radar is separate and distinct from a main radar of the second aircraft.

8. The automatic aircraft positioning system of claim 7, wherein the positioning radar is configured to operate at a first frequency, and the main radar is configured to operate at a second frequency that differs from the first frequency.

9. The automatic aircraft positioning system of claim 1, wherein the second aircraft further comprises an automatic positioning activator, wherein the automatic positioning activator is configured to be engaged to transition the second aircraft from a manual control mode to the automatic positioning mode.

10. The automatic aircraft positioning system of claim 1, wherein the control unit is configured to automatically switch the second aircraft to the automatic positioning mode in response to the one or more fiducials being within range of the positioning radar.

11. The automatic aircraft positioning system of claim 1, wherein the one or more fiducials comprises at least three fiducials.

12. An automatic aircraft positioning method, comprising:
transmitting, from a positioning radar of a second aircraft, a radar transmit signal;
receiving, by the one or more fiducials, the radar transmit signal;
outputting, by one or more fiducials installed on a first aircraft, one or more return signals in response to the radar transmit signal;
receiving, by the positioning radar, the one or more return signals;
determining, by the positioning radar, a position of the second aircraft relative to the first aircraft from the one or more return signals; and
automatically controlling, by a control unit of the second aircraft, the second aircraft in relation to the first aircraft based on said determining during an automatic positioning mode.

13. The automatic aircraft positioning method of claim 12, further comprising outputting, by the positioning radar, a position signal indicative of the position of the second aircraft relative to the first aircraft, and wherein said automatically controlling comprises receiving the position signal and automatically controlling at least one control of the second aircraft based on the position signal.

14. The automatic aircraft positioning method of claim 12, wherein said automatically controlling occurs during an in-flight refueling process.

15. The automatic aircraft positioning method of claim 12, wherein the first aircraft is a fuel tanker, and wherein the second aircraft is configured to be refueled by the fuel tanker during flight.

16. The automatic aircraft positioning method of claim 12, wherein the one or more fiducials are one or more radio frequency identification (RFID) chips secured to an outer portion of the first aircraft or one or more retro-reflector arrays including frequency selective surfaces to minimize unwanted reflections secured to the outer portion of the first aircraft.

17. The automatic aircraft positioning method of claim 12, wherein the positioning radar is separate and distinct from a main radar of the second aircraft, and wherein the positioning radar operates at a first frequency, and the main radar operates at a second frequency that differs from the first frequency.

18. The automatic aircraft positioning method of claim 12, further comprising:
engaging an automatic positioning activator of the second aircraft; and
transitioning the second aircraft from a manual control mode to the automatic positioning mode in response to said engaging.

19. The automatic aircraft positioning method of claim 12, further comprising automatically switching, by the control unit, the second aircraft to the automatic positioning mode in response to the one or more fiducials being within range of the positioning radar.

20. An automatic aircraft positioning system, comprising:
a first aircraft comprising at least three fiducials secured to an outer portion of the first aircraft, wherein the at least three fiducials are radio frequency identification (RFID) chips; and
a second aircraft comprising a positioning radar, a main radar that is separate and distinct from the positioning radar, control devices that are configured to control operation of the second aircraft, and a control unit in communication with the positioning radar and the control devices, wherein the positioning radar is configured to operate at a first frequency, and the main radar is configured to operate at a second frequency that differs from the first frequency,
wherein the positioning radar is configured to transmit a radar transmit signal,
wherein the at least three fiducials are configured to receive the radar transmit signal and output return signals in response to the radar transmit signal,
wherein the positioning radar is configured to receive the return signals and determine a position of the second aircraft relative to the first aircraft from the return signals,
wherein the positioning radar is further configured to output a position signal indicative of the position of the second aircraft relative to the first aircraft,
wherein the control unit is configured to receive the position signal, and
wherein the control unit is configured to automatically control at least one of the control devices of the second aircraft during an automatic positioning mode based on the position signal.

* * * * *